Figures 1, 2:
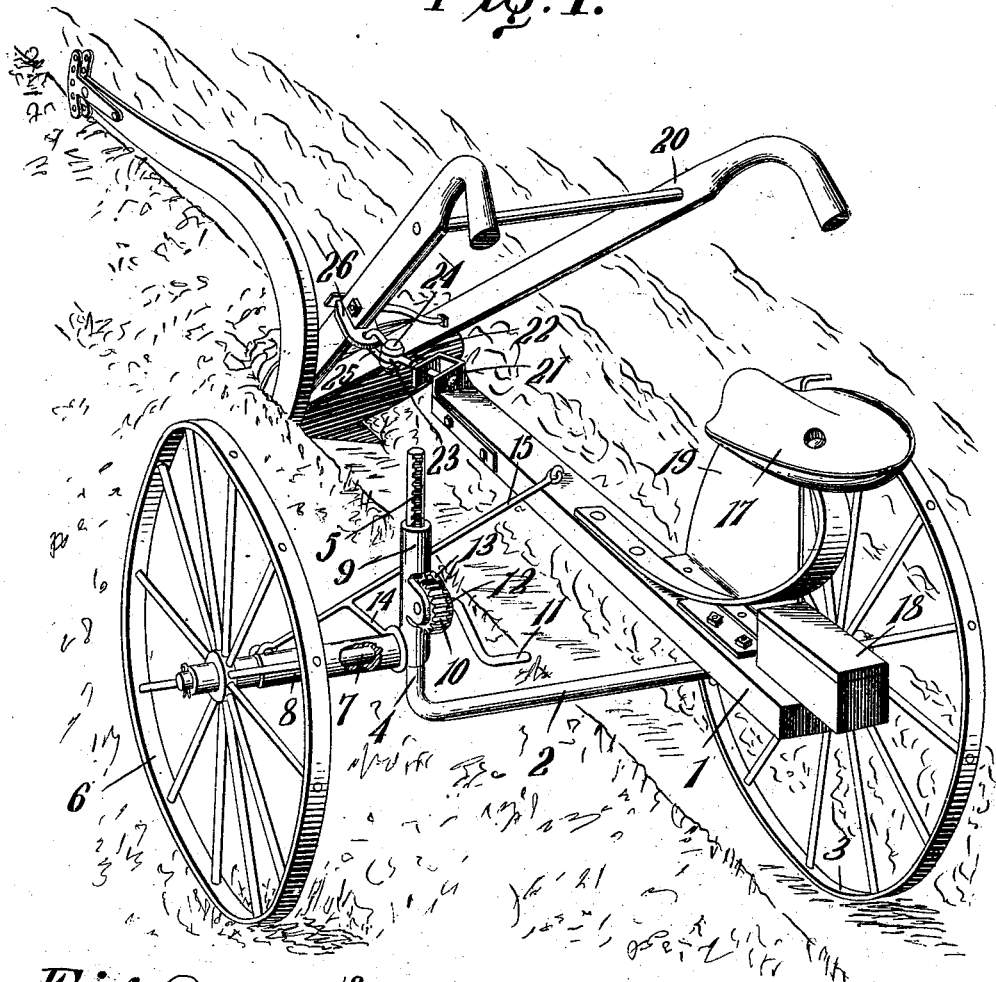

No. 842,438. PATENTED JAN. 29, 1907.
J. W. TURNER.
SULKY ATTACHMENT FOR PLOWS.
APPLICATION FILED JULY 19, 1906.

WITNESSES:

James W. Turner,
INVENTOR.

By C. A. Snow & Co.
ATTORNEYS

UNITED STATES PATENT OFFICE.

JAMES W. TURNER, OF SHELBYVILLE, MISSOURI.

SULKY ATTACHMENT FOR PLOWS.

No. 842,438.  Specification of Letters Patent.  Patented Jan. 29, 1907.

Application filed July 19, 1906. Serial No. 326,916.

*To all whom it may concern:*

Be it known that I, JAMES W. TURNER, a citizen of the United States, residing at Shelbyville, in the county of Shelby and State of Missouri, have invented a new and useful Sulky Attachment for Plows, of which the following is a specification.

This invention relates generally to plows, and particularly to a sulky attachment therefor.

The object of the invention is to provide an extremely strong, simple, durable, inexpensive, and thoroughly-efficient sulky attachment which is adapted to be loosely connected with an ordinary walking-plow without increasing the draft thereof, one of the wheels of said attachment being adapted to run in the furrow and the other of said wheels being adapted to run upon the surface of the ground and to be vertically adjusted whenever necessary to preserve the equilibrium of the sulky attachment.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings, forming part of this specification, Figure 1 is a perspective view showing the improved sulky attachment secured to a right-hand plow. Fig. 2 is a view showing the ratchet-wheel in side elevation.

Like reference-numerals indicate corresponding parts in the different figures of the drawings.

It may be premised that the sulky attachment of this invention is adapted to be loosely connected with either the left handle of a right-hand plow or the right handle of a left-hand plow.

The sulky attachment comprises a beam 1, which is mounted at its rear end in any suitable manner upon the furrow-axle 2, upon the outer end of which is mounted the furrow-wheel 3, adapted to run in the furrow which is being formed by the plow with which the improved attachment is connected. At its inner end the furrow-axle 2 is bent upwardly, as indicated at 4, and is formed with suitable teeth 5. The ground-wheel 6, which is adapted to run upon the surface of the ground adjacent the furrow, is provided with a ground-axle 7, which is fitted into the sleeve portion 8 of an adjusting-box 9, which is provided in its upper and lower ends with suitable perforations to permit the passage through the box of the upwardly-bent toothed end 4 of the furrow-axle 2. Mounted in the adjusting-box 9 is a pinion 10, which is in mesh with the teeth 5 and is adapted to be rotated by means of a crank 11. The crank 11 is provided with a ratchet-wheel 12, with which coöperates a pawl 13, mounted upon the adjusting-box 9, as shown. The mechanism described constitutes simple means for adjusting the ground-wheel 6 in a vertical direction with respect to the furrow-wheel 3, whereby to preserve the equilibrium of the sulky attachment at all times. The sleeve portion 8 of the adjusting-box 9 preferably is engaged by the bifurcated end 14 of a brace-rod 15, which is pivotally connected at its forward end with the beam 1, as indicated at 16. The brace-rod 15 holds the ground-axle 7 in proper position with respect to the furrow-axle 2 and yet does not interfere with the vertical adjustment of the ground-wheel 6.

The seat 17, which may be of any suitable form and construction, preferably is mounted upon the beam 1, as shown. Furthermore, said beam is provided with a tool-box 18 and a wheel-guard 19 for protecting the plowman from the furrow-wheel 3.

The means for loosely connecting the sulky attachment with the handle 20 of an ordinary walking-plow preferably consists of a bracket 21, mounted upon the forward end of the beam 1 and provided with a longitudinally-slidable bolt 22, having at its forward end an eye 23. Connected with the eye 23 by means of a pin 24 is a shackle 25, which in turn is connected with a clamp 26, secured to the handle 20, as shown. The loose connection described between the sulky attachment and the plow causes the attachment to be drawn easily by the plow, so as not to increase the draft thereof. The handles of the plow project into close proximity with the seat 17, so that whenever necessary they can be steadied or guided by the plowman.

The improved attachment of this invention is strong, simple, durable, and inexpensive in construction as well as thoroughly efficient in operation.

It will be apparent that the bolt 22 in the bracket 21 provides a swivel connection between the plow and the forward end of the beam 1, so that when it is necessary to turn the plow with respect to the beam 1 the bolt 22 will permit the operation to be carried out.

What is claimed is—

1. A sulky attachment for plows comprising a furrow-wheel, an axle supported thereby and having an upturned toothed end, a box slidably mounted on the upturned end of the axle, a sleeve extending at right angles therefrom, a ground-wheel supporting said sleeve, a gear carried by the box and engaging the toothed end of the axle, means for manually rotating the gear, means for holding the gear against rotation in one direction, a beam carried by the axle and extending forward therefrom, and a brace connecting the beam and sleeve.

2. A sulky attachment for plows comprising a furrow-wheel, an axle supported thereby and having an upturned toothed end, a box slidably mounted on the upturned end of the axle, a sleeve extending at right angles therefrom, a ground-wheel supporting said sleeve, a gear carried by the box and engaging the toothed end of the axle, means for manually rotating the gear, means for holding the gear against rotation in one direction, a beam carried by the axle and extending forward therefrom, a brace connecting the beam and sleeve, a bracket at the front end of the beam, a longitudinally-movable bolt therein, a plow-handle clamp, and a pivotal connection between said clamp and the bolt.

In testimony that I claim the foregoing as my own I have hereto affixed my signature in the presence of two witnesses.

JAMES W. TURNER.

Witnesses:
T. W. HERBST,
J. W. THOMPSON.